United States Patent Office 3,032,529
Patented May 1, 1962

3,032,529
STABILIZED ORGANOPOLYSILOXANE RESINS
Harold A. Clark, Midland, Mich., assignor to Dow Corning Corporation, Midland, Mich., a corporation of Michigan
No Drawing. Filed June 30, 1958, Ser. No. 745,246
8 Claims. (Cl. 260—46.5)

This invention relates to a mixture of (1) an incompletely condensed organopolysiloxane resin modified with a diorganodiacycloxysilane to eliminate essentially all silicon-bonded hydroxyl groups and (2) a monoorganotriacyloxysilane.

It has been known for several years that incompletely condensed organopolysiloxane resins could be cured by mixing them with a silane such as methyltriacetoxysilane and subsequently heating the mixture until cured. It has also been known that with some formulations cure could be attained at room temperature in air after 48 hours. This is generally shown in U.S. Patent 2,615,861. However, the system described therein is faulty in that a mixture of these two components has poor shelf life. In other words, once these two components are mixed, they will start to interreact, i.e. the acetoxy group and SiOH, to produce acetic acid and SiOSi bonds apparent either as a gel in the body of the mixture or as "skinning" on the surface of the mixture even while stored in a capped container.

Therefore, the principal object of this invention is to produce an organosilicon resin coating composition employing as a curing agent a monoorganotriacyloxysilane, which coating composition neither gels nor skins on standing in a closed container but which cures within 24 hours in air at room temperature when applied as a coating to wood, plastic, metal and ceramic surfaces.

This invention relates specifically to an essentially hydroxyl-free organopolysiloxane resin containing silicon-bonded acyloxy radicals of less than four carbon atoms, said radicals being present in ratios ranging from one per 100 silicon atoms to one per three silicon atoms.

The term "essentially hydroxyl-free" means that the resin contains no detectable amount of silicon-bonded OH groups. If the resin does contain an appreciable amount of such groups, it is not stable to gelation at room temperature, especially when mixed with the triacyloxysilane hereinafter described.

Such a composition is prepared by heating preferably in the range of from 75–150° C. (1) an organopolysiloxane resin having in the vicinity of from 1 to 33.3 mol percent silicon-bonded hydroxyl and/or alkoxyl groups, e.g. methoxyl and ethoxyl groups, and having per silicon atom from 1.1 to 1.7 monovalent hydrocarbon radicals of which preferably from 0.25 to 1.0 radical per silicon is phenyl with (2) a carboxylic acid of less than four carbon atoms or its anhydride or a diorganodiacyloxysilane, the acyl radicals of which contain less than four carbon atoms in a ratio sufficient to produce an essentially hydroxyl-free resin containing from 1 to 33.3 acyloxy groups per 100 silicon atoms. The by-products are distilled off. The best method is to react a diorganodiacyloxysilane with a hydroxylated siloxane resin.

Generally, the organic radicals on silicon of the essentially hydroxyl-free siloxane resin are limited as a practical matter to the phenyl radical and aliphatic hydrocarbon radicals of less than 7 carbon atoms, such as methyl, ethyl, propyl, butyl, amyl, hexyl, vinyl, and allyl and their isomers. However, the organic radicals can be any monovalent hydrocarbon radicals. The presence of the phenyl radical in an amount equal to from .25 to 1 phenyl radical per silicon atom improves the weatherability of the ultimate coating over non-phenyl resins. Mixtures of resins can be used in this invention, but again it is preferable that any resin mixture will be such that there is an average of .25 to 1 phenyl radical per silicon atom in the mixture even though a non-phenyl resin can be included in the mixture.

The organic radicals in the diorganodiacyloxysilane which can be used for acylation of the above described organopolysiloxane can be any monovalent hydrocarbon radicals with the limitation that the total number of carbon atoms in the two radicals on each silicon is less than 13. This limitation allows for silanes to which are attached two phenyl groups or a phenyl group and a lower aliphatic or cycloaliphatic radical or two aliphatic or cycloaliphatic radicals. The acyl radicals attached to the silane-silicon through a SiOC linkage can have from 1 to 3 carbon atoms, e.g. formyl, acetyl and propionyl.

Examples of diorganodiacyloxysilanes which are operative in preparing the compositions of this invention include $Ph_2Si(OAc)_2$, $EtPhSi(OAc)_2$, $Me_2Si(OOCH)_2$, $Me(C_{10}H_{21})Si(OAc)_2$, $(C_2H_3)BuSi(OOCH)_2$, (cyclic-$C_6H_{12}$)iso-$PrSi(OOCCH_2CH_3)(OOCH)$
$(C_6H_{13})_2Si(OAc)_2$, (cyclic-$C_5H_{10})_2Si(OAc)_2$, and (cyclic-$C_4H_8)PhSi(OAc)_2$. Mixtures of these silanes are also operative. The abbreviations used herein are those in common practice in Chemical Abstracts and are defined as follows: Me—methyl, Et—ethyl, Pr—propyl, Bu—butyl, Ph—phenyl and Ac—acetyl.

The acylation of the hydroxylated-alkoxylated resin is most easily done in the presence of a solvent, e.g. xylene, which is inert to both the resin and the acylating agent. The replacement of all of the silicon-bonded hydroxyl groups, if any, originally present in the resin with acyloxy radicals together with the introduction into the resin of acyloxy radicals within the limits of the claims produces a resin essentially inactive by itself but which, when mixed with certain monoorganotriacyloxysilanes, has very good shelf life and yet is sufficiently active to form a cured coating within 24 hours at room temperature in air.

This invention also relates then to a mixture of the above-described acyloxated organopolysiloxane with a monohydrocarbotriacyloxysilane in which each hydrocarbon radical contains less than four carbon atoms and each acyloxy radical contains less than four carbon atoms.

More specifically, the monoorganotriacyloxysilane can contain any monovalent hydrocarbon of from 1 to 3 carbon atoms, e.g. methyl, ethyl, vinyl, propyl, and their isomers. The acyloxy radicals can be any of those described above. Examples of operative monoorganotriacyloxysilanes include $MeSi(OAc)_3$, $EtSi(OAc)_3$, $PrSi(OOCH)_3$
and
$C_2H_3Si(OOCCH_2CH_3)(OOCH)_2$ The operative monoorganotriacyloxysilanes can be employed individually or in mixtures and can be added as 100% solids or in solution in an inert solvent, e.g. toluene.

The amount of monoorganotriacyloxysilane which must be added to the stabilized acyloxated organopolysiloxane resins of this invention to facilitate curing is not critical. However, less than 0.5 molecule of the silane per siloxane-silicon-bonded acyloxy group gives negligible results. More than 3 molecules of silane per siloxane-silicon-bonded acyloxy group is unnecessary.

The diorganodiacyloxysilanes and monoorganotriacyloxysilanes employed in this invention are prepared by reacting the corresponding chlorosilanes with the desired carboxylic acid or its anhydride or an alkali metal salt thereof. This type of reaction is well known in the art as is the preparation of the desired chlorosilanes by the addition of organic radicals to silicon tetrachloride or trichlorosilane by the use of a Grignard reagent or the addition of an unsaturated compound to silicon-bonded hydrogen as in trichlorosilane or a monoorganodichlorosilane.

In the preparation of the compositions of this invention there is no criticality in the presence or absence of inert solvents at any step. Examples of such solvents which can be used in preparing and using the compositions of this invention include benzene, toluene, xylene, perchloroethylene, chlorobenzene, dibutylether and methylisobutylketone.

The stabilized acyloxated organopolysiloxanes of this invention have excellent shelf life. The mixture compositions of this invention will neither gel nor skin after standing long periods of time in a closed container, but upon being exposed to air as in a coating application on, for example, wood, metal, ceramic, glass or plastic surfaces, these compositions can be easily cured by mere air-drying at room temperature.

Additives such as pigments, antioxidants, ultraviolet absorbents and the like can be included in the compositions of this invention.

The following examples are merely illustrative and are not intended to limit this invention which is properly delineated in the claims. In these examples, resin A is a copolymer of 55 mol percent phenylmethylsiloxane units, 30 mol percent monomethylsiloxane units and 15 mol percent monophenylsiloxane units and contains one silicon-bonded hydroxyl group per 14.7 silicon atoms. Resin B is a copolymer of 31.4 mol percent phenylmethylsiloxane units, 34 mol percent monomethylsiloxane units and 34.6 mol percent monophenylsiloxane units and contains one silicon-bonded hydroxyl group per 21.9 silicon atoms.

*Example 1*

Fifty grams of resin A and 50 grams of resin B, each added as a 50% by weight solution in xylene, were mixed with 8.8 grams of dimethyldiacetoxysilane (equivalent to one molecule of silane per silicon-bonded hydroxyl group). This mixture was refluxed for 20 minutes, after which 22 ml. of solvent containing 2½ ml. of acetic acid were distilled out. Fifty ml. of a high-boiling, commercial aromatic solvent were added to the mixture. Subsequently, 10.5 grams of monomethyltriacetoxysilane (equivalent to 0.95 molecule of silane per silicon-bonded acetoxy group in the siloxanes) were added to the mixture. The resulting solution was applied to an aluminum panel. The coating air-dried tack-free to the touch in 15 minutes and was cured within four hours.

*Example 2*

Sixty-six and two-thirds grams of resin A and 33⅓ grams of resin B, each added as a 50% by weight solution in xylene, were refluxed for 30 minutes with 9.5 grams of dimethyldiacetoxysilane equivalent to one molecule of silane per silicon-bonded hydroxyl group. Thirty-five grams of solvent were distilled off from 133 to 145° C. containing the theoretical equivalent amount of acetic acid. This solvent was replaced with a high-boiling, commercial aromatic solvent and 10 grams of methyltriacetoxysilane equivalent to 0.84 molecule of silane per siloxane-silicon-bonded acetoxy group were added to the system.

Cedar panels were brush-coated with the resulting solution. The coatings cured in 24 hours at room temperature in air and have shown excellent resistance to weathering conditions duplicated by a Weatherometer. The excess resin solution has not gelled or skinned-over after 7 weeks of storage in a capped container.

*Example 3*

Six hundred grams of resin A and 300 grams of resin B, each copolymer added as a 50% by weight solution in xylene, were mixed with 171 grams of dimethyldiacetoxysilane equivalent to two molecules of silane per silicon-bonded hydroxyl group. This mixture was refluxed for 2½ hours after which 218 grams of distillate were removed in the range of from 110–135° C. This distillate contained the theoretical equivalent of acetic acid. The pot residue was found by infra-red analysis to contain no silicon-bonded hydroxyl groups.

The pot residue was further diluted with a high-boiling commercial aromatic solvent to 50% solids. Four hundred grams of this solution were mixed with 20 grams of monomethyltriacetoxysilane equivalent to approximately .65 molecule of silane per siloxane-silicon-bonded acetoxy group. This mixture applied as a coating on redwood panels cured in 24 hours at room temperature in air.

*Example 4*

When 100 grams of the following organopolysiloxanes are reacted with 44 grams of dimethyldiacetoxysilane by dissolving them in toluene and refluxing the system for one hour, the resulting products in each case, when mixed with methyltriacetoxysilane in amounts of from 25 grams to 132 grams do not gel or skin after having been stored in a capped container for more than two weeks. Coatings of these mixtures on steel, aluminum, plastic, ceramic and glass surfaces cure in less than six hours in air at room temperature. Coatings of these mixtures on wood surfaces cure within 24 hours in air at room temperature.

A mixture of (1) 50 grams of a copolymer of 75 mol percent monomethylsiloxane units, 24 mol percent dimethylsiloxane units and 1 mol percent trimethylsiloxane units, said copolymer containing one silicon-bonded hydroxyl group per 61.6 silicon atoms, and (2) 50 grams of a copolymer of 25 mol percent monomethylsiloxane units 35 mol percent monophenylsiloxane units, 20 mol percent dimethylsiloxane units and 20 mol percent diphenylsiloxane units and containing one silicon-bonded hydroxyl group per 2.9 silicon atoms.

A copolymer of 22 mol percent isopropylvinylsiloxane units, 30 mol percent monophenylsiloxane units, 5 mol percent monohexylsiloxane units, 1 mol percent monooctadecylsiloxane units, 1 mol percent monocyclopentylsiloxane units, 1 mol percent monobenzylsiloxane units, and 40 mol percent diethylsiloxane units and containing one silicon-bonded hydroxyl group per 7.9 silicon atoms.

A copolymer of 85 mol percent monophenylsiloxane units, 10 mol percent dimethylsiloxane units and 5 mol percent diphenylsiloxane units and containing one silicon-bonded hydroxyl group per 3.7 silicon atoms.

*Example 5*

When any of the following silanes are substituted for the 9.5 grams of dimethyldiacetoxysilane in Example 2, mixtures having the same excellent shelf life and coating properties as the ultimate mixture of Example 2 are obtained.

18.3 grams of PhMeSi(OAc)$_2$
10.2 grams of C$_2$H$_3$MeSi(OAc)$_2$
14.4 grams of

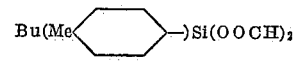

14.8 grams of (CH$_3$(CH$_2$)$_3$$\overset{Et}{C}$HCH$_2$—)PrSi(OOCH)$_2$

A mixture of 3.5 grams of

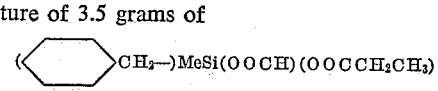

and 10 grams of cyclopentylethyldiacetoxysilane.

*Example 6*

When the following silanes are substituted for the 10.5 grams of monomethyltriacetoxysilane in Example 1, the resulting mixtures have a shelf life of over two weeks and have essentially the same coating properties as the ultimate mixture of Example 1.

8.5 grams MeSi(OOCH)$_3$
11.1 grams C$_2$H$_3$Si(OAc)$_3$
9.2 grams EtSi(OOCH)$_3$
11.2 grams MeSi(OOCH)(OOCCH$_2$CH$_3$)$_2$
9.1 grams C$_2$H$_3$Si(OOCH)$_3$
10.2 grams of an equimolar mixture of MeSi(OAc)$_3$ and PrSi(OOCH)$_3$

Example 7

When 100 grams of resin A are methoxylated to contain only one silicon-bonded hydroxyl group per 22 silicon atoms and one silicon-bonded methoxyl group per 7.4 silicon atoms and are mixed with 10.4 grams of dimethyldiacetoxysilane in 30 grams of xylene and the mixture is refluxed for 30 minutes, the resulting product mixed with 10 grams of monomethyltriacetoxysilane has a shelf life, i.e. will not skin or gel, of over two weeks and when applied to an aluminum panel gives a coating which cures within four hours.

That which is claimed is:

1. A composition of matter consisting essentially of a solvent-soluble essentially hydroxyl-free organopolysiloxane having per silicon atom from 1.1 to 1.7 monovalent hydrocarbon radicals bonded to silicon through a carbon to silicon bond and containing silicon-bonded acyloxy radicals of less than four carbon atoms in amount equal to from one acyloxy radical per 100 silicon atoms to one acyloxy radical per three silicon atoms.

2. A mixture of the composition of claim 1 with a monohydrocarbotriacyloxysilane in which each hydrocarbon radical contains less than four carbon atoms and each acyloxy radical contains less than four carbon atoms.

3. A composition of matter consisting essentially of a solvent-soluble, essentially hydroxyl-free organopolysiloxane having per silicon atom from 1.1 to 1.7 monovalent hydrocarbon radicals bonded to silicon through a carbon to silicon bond of which from 0.25 to 1 radical per silicon is the phenyl radical and the remaining radicals are alkyl radicals of less than seven carbon atoms, said siloxane containing silicon-bonded acyloxy radicals of less than four carbon atoms in amount equal to from one acyloxy radical per 100 silicon atoms to one acyloxy radical per three silicon atoms.

4. A mixture of the composition of claim 3 with a monohydrocarbotriacyloxysilane in which each hydrocarbon radical contains less than four carbon atoms and each acyl radical contains less than four carbon atoms.

5. A composition of matter consisting essentially of a solvent-soluble esssentially hydroxyl-free organopolysiloxane having per silicon atom from 1.1 to 1.7 phenyl and methyl radicals of which from 0.25 to 1 radical is the phenyl radical, said siloxane containing silicon-bonded acyloxy radicals of less than four carbon atoms in amount equal to from one acyloxy radical per 100 silicon atoms to one acyloxy radical per three silicon atoms.

6. A mixture of the composition of claim 5 with a monohydrocarbotriacyloxysilane in which each hydrocarbon radical contains less than four carbon atoms and each acyl radical contains less than four carbon atoms.

7. A method for stabilizing organopolysiloxane resins comprising reacting by heating in the range from 75 to 150° C. (1) a solvent-soluble, organopolysiloxane resin containing an average of from 1.1 to 1.7 monovalent hydrocarbon radicals bonded to silicon through a carbon to silicon bond per silicon atom and an average of from 0.01 to 0.333 hydroxyl radicals per silicon atom with (2) a composition selected from the group consisting of carboxylic acids of less than four carbon atoms, anhydrides of said carboxylic acids and diorganodiacyloxysilanes in which the organic radicals are monovalent hydrocarbon radicals and the acyl radicals contain less than four carbon atoms, (2) being present in sufficient amount to react with essentially all of the hydroxyl radicals.

8. The method of claim 7 where an average of from 0.25 to 1.0 monovalent hydrocarbon radical per silicon atom of (1) is the phenyl radical and (2) is a diorganodiacyloxysilane in which the organic radicals are monovalent hydrocarbon radicals and the acyl radicals contain less than four carbon atoms.

References Cited in the file of this patent

UNITED STATES PATENTS

| | | |
|---|---|---|
| 2,562,953 | Rust | Aug. 7, 1951 |
| 2,615,861 | Peyrot et al. | Oct. 28, 1952 |
| 2,623,832 | MacKenzie et al. | Dec. 30, 1952 |
| 2,634,285 | Rust et al. | Apr. 7, 1953 |
| 2,910,496 | Bailey et al. | Oct. 27, 1959 |